United States Patent [19]

Coderre et al.

[11] Patent Number: 5,200,851
[45] Date of Patent: Apr. 6, 1993

[54] INFRARED REFLECTING CUBE-CORNERED SHEETING

[75] Inventors: James C. Coderre, Lake Elmo; David M. Burns, Woodbury, both of Minn.

[73] Assignee: Minnesota Mining and Manufacturing Company, St. Paul, Minn.

[21] Appl. No.: 835,619

[22] Filed: Feb. 13, 1992

[51] Int. Cl.⁵ .................. G02B 5/124; G02B 5/22
[52] U.S. Cl. .................. 359/351; 359/529; 359/530; 252/587
[58] Field of Search .......... 359/350, 351, 529, 530, 359/531, 532, 533; 252/587

[56] References Cited

U.S. PATENT DOCUMENTS

| T987,003 | 10/1979 | Johnson et al. |  |
|---|---|---|---|
| 2,930,893 | 3/1960 | Carpenter et al. | 359/529 |
| 3,190,178 | 6/1965 | McKenzie. |  |
| 3,374,044 | 3/1968 | Benson | 359/529 |
| 3,563,771 | 2/1968 | Tung. |  |
| 3,712,706 | 1/1973 | Stamm. |  |
| 3,758,193 | 9/1973 | Tung. |  |
| 3,830,682 | 8/1974 | Rowland | 359/530 |
| 4,025,159 | 5/1977 | McGrath. |  |
| 4,202,600 | 5/1980 | Burke et al. |  |
| 4,243,618 | 1/1981 | Van Arnam | 264/1 |
| 4,576,850 | 3/1986 | Martens | 428/156 |
| 4,588,258 | 5/1986 | Hoopman. |  |
| 4,733,236 | 3/1988 | Matosian | 359/529 |
| 4,775,219 | 10/1988 | Appeldorn et al. |  |
| 4,806,925 | 2/1989 | Simard et al. | 340/815.25 |
| 4,957,335 | 9/1990 | Kuney, Jr. |  |
| 5,008,527 | 4/1991 | Wilk | 359/529 |
| 5,066,098 | 11/1991 | Kult et al. | 359/540 |
| 5,072,313 | 12/1991 | Schweitzer et al. | 359/529 |
| 5,128,794 | 7/1992 | Mocker et al. | 359/529 |
| 5,138,488 | 8/1992 | Szczech | 359/529 |

OTHER PUBLICATIONS

United States Defensive Publication T987,003 (Johnson et al.).

Primary Examiner—Martin Lerner
Attorney, Agent, or Firm—Gary L. Griswold; Walter N. Kirn; Robert H. Jordan

[57] ABSTRACT

Cube-corner type retroreflective articles which retroreflect infrared light but do not substantially retroreflect visible light. The cube-corner elements comprise a polymeric matrix selected to be highly transmissive to infrared light but substantially opaque to visible light.

15 Claims, 1 Drawing Sheet

INFRARED REFLECTING CUBE-CORNERED SHEETING

FIELD OF INVENTION

The present invention relates to retroreflective articles, particularly cube-corner type retroreflective articles which retroreflect infrared light.

BACKGROUND

Retroreflective articles are made in a variety of forms, including sheetings such as are used on traffic signs and license plates, rigid safety reflectors mounted on motor vehicles and bikes, patches and appliques such as are applied to garments and book bags, etc. One major use of retroreflective sheeting is in the field of highway markings and signage to improve the visibility and legibility of informational signs, traffic directions, barriers, etc. to drivers.

One common type of retroreflector employs transparent microspheres, typically with hemispheric reflectors thereon. Illustrative examples of such retroreflectors are disclosed in U.S. Pat. Nos. 3,190,178 (McKenzie), 4,025,159 (McGrath), and 5,066,098 (Kult).

A second common type of retroreflector employs what are referred to as cube-corner elements. Cube-corner retroreflectors typically comprise a sheet having a generally planar front surface and an array of cube-corner elements protruding from the back surface. In use, the retroreflector is arranged with the front surface disposed toward the anticipated location of intended observers. Light incident to the front surface enters the sheet, passes through the body of the sheet to be internally reflected by the faces of the elements so as to exit the front surface in a direction substantially toward the light source, i.e., retroreflection. Illustrative examples of cube-corner type retroreflectors are disclosed in U.S. Pat. Nos. 3,712,706 (Stamm), 4,025,159 (McGrath), 4,202,600 (Burke et al.), 4,243,618 (Van Arnam), 4,576,850 (Martens), 4,588,258 (Hoopman), and 4,775,219 (Appeldorn et al.).

It is known to alter the color of either microsphere-based or cube-cornered retroreflectors by incorporating colorants, e.g., dyes and/or pigments, in overlays which are disposed within the path of retroreflected light or within the retroreflective elements themselves. In addition, incorporation of colorants in the binder layer of microsphere-based retroreflectors has been disclosed.

Retroreflectors are most well known for the capability to retroreflect visible light they exhibit. It would be advantageous in some applications, however, to employ the desirable properties of retroreflectors to selectively retroreflect infrared light without substantially reflecting or retroreflecting visible light. Such retroreflectors would enable the use of signs and markings detectable only by infrared viewing devices located at narrow observation angles relative to an infrared illumination source, while avoiding distracting and/or unwanted detection of the marking by persons in the general vicinity. Such a development would allow inconspicuous marking of and/or signaling by articles for security purposes or identification.

Articles which retroreflect infrared light have been proposed in the past but suffered serious shortcomings. U.S. Pat. No. 3,758,193 (Tung) discloses embedded-lens type retroreflectors comprising overlays containing pigments selected to transmit infrared light and absorb visible light. A disadvantage of such retroreflectors is that they will retroreflect visible light when the overlay is removed. Thus, if the article delaminates or the overlay is scratched, the article may retroreflect visible light undesirably.

U.S. Pat. No. 3,563,771 (Tung) discloses black glass microspheres which are highly transmissive to infrared light and highly absorptive to visible light. A disadvantage of such retroreflectors lies in the production thereof. The manufacture of suitable microspheres for retroreflective products in general is a sophisticated process as discussed in U.S. Pat. No. 4,957,335 (Kuney) for instance. Accordingly, the same facilities used to manufacture IR selective microspheres are typically also used to manufacture microspheres for use in visible light retroreflectors, presenting problems of contamination. Cleaning such facilities of residues from visible light transmissive glass is exceedingly difficult. In one illustrative manufacturing experience, an extensive one-week attempt to remove all visible light transmissive, i.e., uncolored, glass residue from a production facility prior to production of IR selective glass microspheres was unsuccessful. Low contamination levels can impart unacceptable levels of visible light retroreflection to resultant microsphere-based retroreflective articles, depending upon the embodiment. Depending upon the tolerance of acceptable levels of visible light retroreflection, production of IR selective microspheres may require a separate, dedicated production facility, an economically undesirable option.

SUMMARY OF INVENTION

The present invention provides novel cube-corner type retroreflective articles that retroreflect infrared light while retroreflecting substantially no visible light.

In brief summary, a retroreflective article of the invention is an article having first and second major sides, the first side being substantially flat and the second side having an array of cube-corner retroreflective elements thereon, wherein the elements comprise a polymeric matrix which is highly transmissive to at least some wavelengths of infrared light but which is substantially absorptive opaque to visible light. The retroreflective articles of the invention are sometimes referred to herein as "IR-selective retroreflectors".

As discussed below, the matrix typically comprises a polymer which is transmissive to both visible light and infrared light and colorant, e.g., a pigment or dye, which is highly transmissive to at least some wavelengths of infrared light but is substantially opaque to visible light.

Infrared retroreflectors of the invention exhibit a surprisingly high infrared retroreflective efficiency while effectively filtering visible light. Infrared retroreflectors of the invention can also exhibit brighter infrared retroreflective brightness than previously known infrared selective retroreflectors. The infrared retroreflectors provided herein are also more resistant to catastrophic loss of selectivity than are the overlay type retroreflectors known before.

BRIEF DESCRIPTION OF DRAWING

The invention will be further explained with reference to the drawing, wherein.

Figure 1:
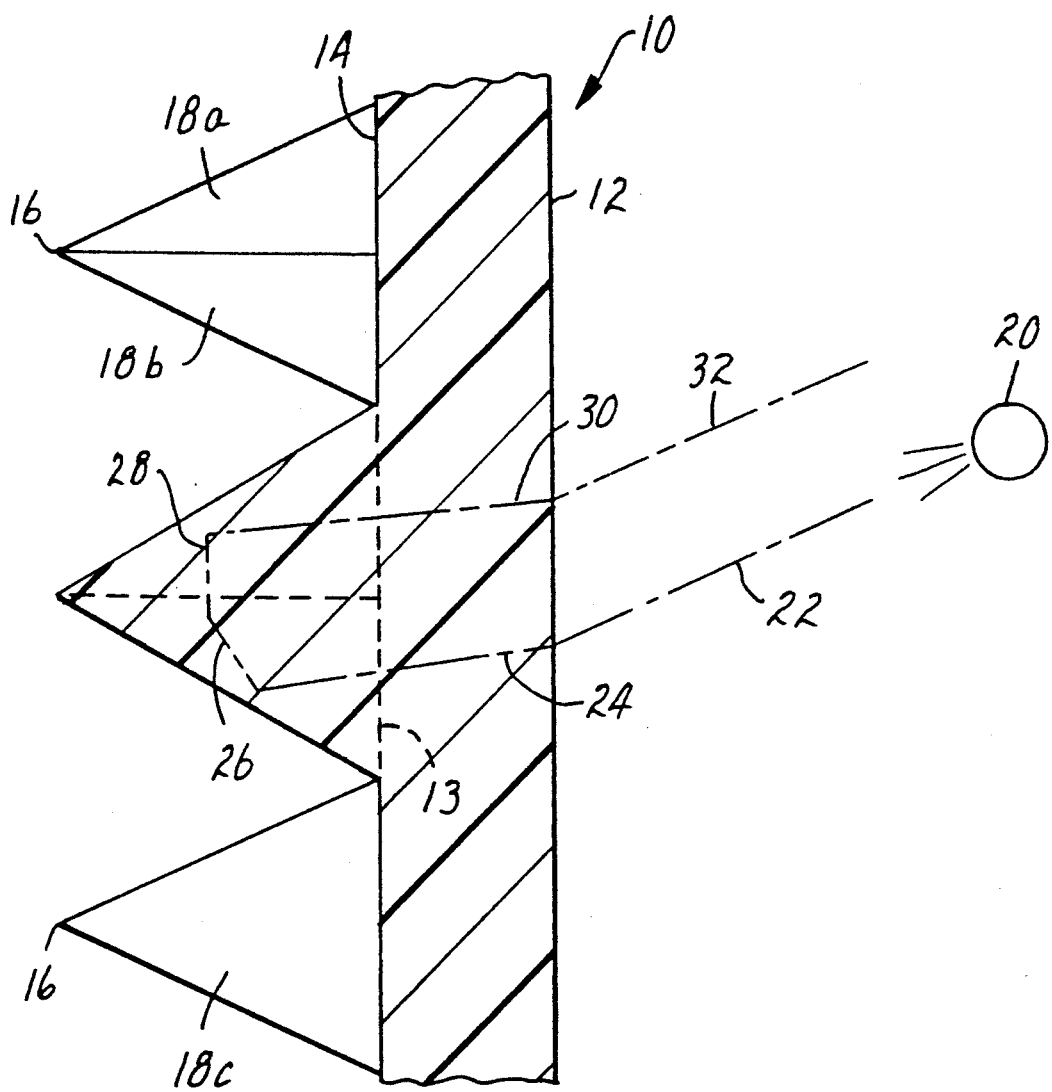
FIG. 1 is a schematic view of a cross-section of an illustrative IR-selective retroreflector of the invention.

This FIGURE, which is idealized, is not to scale and is intended to be merely illustrative and non-limiting.

DETAILED DESCRIPTION OF ILLUSTRATIVE EMBODIMENTS

The limits of the visible spectrum are not well defined largely because the relative sensitivity of the human eye asymptotically approaches zero at both the long and short wavelength ends of the visible spectrum. Normal vision with the unaided eye drops to about one percent of maximum sensitivity at wavelengths of about 380 mu (millimicrons, 1 millimicron being equal to 1 nanometer) and about 700 mu. Some individuals with better than normal eyesight, however, are capable of detecting light up to wavelengths of about 750 mu with low efficiency. As used herein, the term "visible light" refers to light having wavelengths from about 400 mu to about 700 mu. As used herein, the term "infrared light" refers to light having wavelengths from about 750 mu to about 1100 mu.

As shown in FIG. 1, IR-selective retroreflector 10 of the invention has front face 12 and rear face 14 with an array of cube-corner retroreflective elements 16 thereon. A great number of visible light reflecting cube-corner retroreflectors with a variety of variations of cube-corner elements are known. Illustrative examples are disclosed in the aforementioned U.S. Pat. Nos. 3,712,706, 4,202,600, 4,243,618, 4,588,258, and 4,775,219. All of these patents are incorporated herein by reference in their entirety. It will be understood that IR-selective retroreflectors, made in accordance with this invention, may be made in a variety of embodiments with desired retroreflective patterns and orientations based on the disclosures of these references and related techniques known to those skilled in the art.

In the embodiment shown in FIG. 1, each of cube-corners 16 has three facets or sides 18a, 18b, and 18c. The general nature of retroreflection by article 10 may be explained as follows. Light source 20, e.g., the headlights of an approaching vehicle, emits light beam 22 which is incident to front surface 12. If light 22 is incident to front surface 12 at a sufficiently low angle to the normal at the point of incidence, i.e., the "critical angle", the incident light refracts into article 10, shown as ray 24. By "critical angle" is meant that angle at which light in an optically dense medium encountering a surface with a less optically dense medium is totally reflected internally from the surface rather than entering the optically less dense medium. The internally transmitted light follows path 24 until encountering facet 18a. Because the angle of the path 24 exceeds the critical angle in relationship to facet 18a, the light is internally reflected from the surface 18a and remaining within the article 10 and following path 26. The light continues on path 26 until encountering facet 18b. Because the angle between facet 18b and the path 26 exceeds the critical angle, the light is again internally reflected within the sheet 10 and begins traveling along path 28 until encountering facet 18c. Because the angle between facet 18c and the path 28 exceeds the critical angle, the light is again internally reflected and begins traveling along path 30 back toward front face 12. Path 30 is slightly offset from and parallel to path 24. The light continues on path 30 until re-encountering front face 12 at an angle less than the critical angle. The light exits through the front face 12 and is returned back toward light source 20 along path 32. Path 32 is slightly offset from and parallel to the path 22 of the original incident light.

"Pathlength" is used herein to mean the sum of the individual extents or lengths of the series of paths traveled by light retroreflected by the retroreflector within the retroreflector. In the illustrative drawing, the pathlength is the sum of paths 24, 26, 28, and 30. For cube-corner type retroreflectors, the minimum pathlength, i.e., the minimum length that light which is retroreflected by the article must travel within the retroreflector is approximately equal to twice the thickness of the sheeting between the front face 12 and base plane 13 plus twice the height of cube-corner elements 16. "Selective pathlength" is used herein to mean the portion of the pathlength which is within IR-selective portions of the retroreflector.

Retroreflectors of the present invention differ from previously known cube-corner retroreflectors in that the cube-corner elements are IR-selective. The retroreflector is formed from a material which contains a polymer, typically transmissive to both visible light and infrared light material, and a colorant (i.e., a dye) or combination of colorants sufficient to absorb, over the extent of the minimum pathlength, substantially all of the visible wavelength components of the incident light while transmitting observable portions of infrared light.

In IR-selective retroreflectors of the invention, the polymeric matrix typically absorbs at least about 90 percent, preferably at least about 99 percent, and more preferably at least about 99.5 percent, of all wavelengths of visible light, i.e., light having a wavelength between about 400 mu and about 700 mu. Typically, the matrix transmits at least about 25 percent, preferably at least about 50 percent, more preferably at least about 90 percent, and most preferably at least about 95 percent of all wavelengths of infrared radiation, i.e., light having wavelength between about 750 mu and about 1100 mu.

In embodiments where the retroreflection of visible light is to be minimized, it is typically preferable that the matrix absorb at least about 99.5 percent of all wavelengths of light between about 380 mu and about 750 mu.

Illustrative examples of polymers that can be used in retroreflectors of the invention include polycarbonate, polyalkylacrylates, polyalkylmethacrylates (especially polymethyl methacrylate (PMMA)), polyesters, vinyl polymers, polyurethanes, cellulose esters, fluoropolymers, polyolefins, ionomeric copolymers and copolymers of ethylene or propylene with acrylic acid, methacrylic acid, or vinyl acetate. Mixtures of such polymers may be used if desired. Polycarbonates typically exhibit tough, durable character whereas polyacrylics typically exhibit greater retention of properties even when subjected to high colorant loadings.

Colorants which may be used herein include dyes and pigments which may be dissolved or dispersed, respectively, in the polymer and absorb at least some portions of visible light absorption while permitting transmission of at least some infrared light. Ideally it would be desirable to employ a single colorant which strongly absorbs all visible light and is highly transmissive to infrared light. While a single colorant with these ideal properties has not yet been identified or synthesized by the inventors, such properties can be obtained from mixtures of known dyes and/or pigments. Accordingly, two or more colorants will typically be employed to absorb visible light. Depending upon the embodiment, the retroreflector may retroreflect most of the IR spectrum or portions thereof may be blocked.

The colorant(s) and polymer should be compatible, i.e., the polymer should be capable of acting as a medium in which sufficient amounts of colorant(s) are dissolved or dispersed to absorb visible light as desired without undesirably degrading the properties of the polymer or resultant matrix. Preferably, the colorant will be stable within the matrix and will not tend to bloom or migrate therefrom.

Illustrative examples of dyes which are believed to be suitable for use herein include the following, identified by the Colour Index ("C.I.") Generic Name assigned by the Society of Dyers and Colourists and the American Association of Textile Chemists and Colorists (as noted in the Colour Index, third Edition, 1982):

| | |
|---|---|
| Violet: | C.I. Solvent Violet, 13, 31, 32, 33, and 36; |
| Blue: | C.I. Solvent Blue 94, 97, 101, and 121, and C.I. Disperse Blue 60 and 198; |
| Green: | C.I. Solvent Green 3, 26, and 28; |
| Yellow: | C.I. Solvent Yellow 93, 112, 113, 128, 129, 130, and 163, and C.I. Disperse Yellow 54, 64, and 160; |
| Orange: | C.I. Solvent Orange 60, 68, 72, and 86, and C.I. Disperse Orange 47; and |
| Red: | C.I. Solvent Red 52, 111, 117, 135, 138, 139, 169, 195, and 297 and C.I. Disperse Red 5. |

These colorants are variously available from one or more of BASF, Bayer AG, Color Chem International, and/or Mitsubishi Chemical Industries. Amplast Violet PK from Color Chem is also useful.

Pigments used in IR-selective retroreflectors are preferably of small particle size, i.e., below about 3 to 4 microns typically, to facilitate dispersion in the polymeric matrix and ensure that they are sufficient transparent to permit desired retroreflection of infrared light by the resultant article. Illustrative examples of pigments which are believed to be suitable herein include LITHOSOL TM Fast Scarlet red), Benzedine Yellow, HELIOGEN TM Blue series, C.I. Pigment Green 7 (a copper thiocyanine), C.I. Pigment Blue 15 (a copper thiocyanine), C.I. Pigment Red 167 (an anthroquinone), and C.I. Pigment Yellow 89 (a disazo).

Typically, combinations of two or more colorants are necessary to provide desired visible light absorption. Suitable combinations of colorants for use herein can be selected by first considering the absorption spectra of a first colorant. Within the absorption spectra of the first colorant, wavelengths can be determined in which the colorant is strongly absorbing and other wavelengths can be determined in which the colorant is weakly absorbing. A second colorant for the mixture is then selected based upon its ability to absorb the wavelengths not absorbed (i.e., transmitted) by the first colorant. It may be necessary to select a third and possibly a fourth and even a fifth colorant for the mixture to assure that strong absorption can be provided at all visible light wavelengths. Generally, mixtures of two, three, or four colorants are sufficient to absorb substantially all visible light wavelengths. It will be understood that it is the optical properties of the colorant in the polymeric matrix, rather than the specific chemical or chemical structures, of the colorant (or colorant mixture), which are essential to the present invention.

Relative proportions of colorants in the mixture can be readily determined by trial and error. While it is possible to roughly estimate the relative proportions, it is believed that the concentrations of colorants employed are at or approaching concentrations at which Lambert's Law offers only limited guidance.

The minimum thickness of a smooth-sided sheet (or blank) needed to form a cube-cornered structure via embossing is approximately one-third the depth of the desired cube-cornered structure. The pathlength of such a cube-cornered structure is approximately two times the depth of the cube-cornered structure. The pathlength of a smooth-sided sheet is at least about two times the thickness of the sheet (normal to the surface). Thus, for a given amount of polymer and colorant(s), the visible light absorption efficiency of a cube-cornered structure is three times greater than that of a flat sheet of equal area. This surprising result is in addition to the elimination of potential retroreflection of visible light after scratching an oversheet.

One suitable test for determining the effectiveness of a mixture of colorants in a particular retroreflector is to prepare a sample of the desired cube-cornered retroreflector and then observing the retroreflective appearance using a strong incandescent light source. Retroreflectors exhibiting the preferred high absorption of visible light at all visible light wavelengths typically appear generally black. Retroreflectors which are less effective visible light absorbers will appear colored. Verification of a retroreflector's ability to retroreflect infrared light can be accomplished by observing the retroreflector in a darkened room through an infrared viewing device incorporating both an infrared illumination source and an infrared viewer. The FIND-R-SCOPE TM Viewer, available from F. J. W. Industries of Mt. Prosperity, N.Y., is an illustrative example of such devices.

IR-selective retroreflectors may also be evaluated by observation with an RI-1000 License Plate Reader available from Minnesota Mining and Manufacturing Company ("3M") of St. Paul, Minn. Such a reader can be fitted with a filter to eliminate passage of light with wavelengths below 850 nm at both the illumination source and the camera lens. It is helpful to also include a filter to prevent passage of light above 910 nm wavelength in order to limit the band of light measured, permitting a more standardized assessment of the unfiltered wavelengths. In such a system, the camera measures retroreflected light from a small area of a sheeting sample being tested and quantifies the area as the retroreflected light detected by one pixel of the camera screen. The results are presented on a gray scale (non-linear) of from 20 to 255 with 255 being the maximum retroreflection and 20 being no detectable retroreflection.

In embodiments which are to be used in environments where the retroreflector is likely to be exposed to moisture, e.g., outdoors or in high humidity, it is preferred that the cube-corners be encapsulated with a sealing film such as is disclosed in the aforementioned U.S. Pat. No. 4,025,159. If encapsulated, a layer of adhesive may be applied to the back side of the sealing film to provide a means for securing the retroreflector to a desired substrate.

In some embodiments, the surfaces of the cube-corner elements may be metallized, e.g., with silver or aluminum, to modify the retroreflective performance of the article, and also eliminate the need for a seal film. If desired, a layer of adhesive may be applied to the back side of the metal layer.

To compare an IR-selective retroreflector of the invention with the visible light absorbing oversheet of the aforementioned U.S. Pat. No. 3,758,193, providing the visible wavelength absorption capacity with a oversheet requires a near tripling in the material which must be employed relative to retroreflectors of the invention. This results in a higher material cost in manufacturing a composite retroreflector as well as additional process steps in combining the oversheet and the base retroreflector. Furthermore, a composite cube-cornered retroreflector and a visible wavelength-absorbing oversheet is roughly twice as heavy as an equivalently performing retroreflector of the present invention.

EXAMPLES

The invention will be further explained by the following illustrative examples which are intended to be nonlimiting. Unless otherwise indicated, all amounts are expressed in parts by weight.

Unless otherwise indicated, retroreflective brightness of visible light was measured using a retroluminometer as described in U.S. defensive publication no. T987,003 at a divergence angle of about 0.2° and at an entrance angle of about −4°.

Four different colors (red, yellow, green, and violet) of dye-loaded pellets, prepared as follows, were used. Sufficient dye to yield a 3 weight percent dye loading was added to LUCITE TM 47K Polymethylmethacrylate, a fine, spherical PMMA from E. I. Du Pont De Nemours and Company ("DuPont"), blended in a paint shaker, and dried overnight. The mixture was then compounded with a twin screw extruder to form about 200 grams of colored pellets. The colorants were as follows:

| Color | Dye |
| --- | --- |
| red | PEROX TM Red 60, a C.I. Solvent Red 117 from Morton Chemical, |
| yellow | MACROLEX TM Yellow 3G, a C.I. Solvent Yellow 93 from Mobay Chemical Corp., |
| green | MACROLEX TM Green G, C.I. Solvent Green 28 from Mobay Chemical Corp., |
| violet | AMOPLAST TM Violet PK from Color Chem International. |

Example 1

A cube-corner retroreflector was made with an IR-selective polymeric matrix made from a composition comprising 100. grams of red pellets, 16.60 grams of yellow pellets, 50. grams of violet pellets, and 33.40 grams of green pellets. The pellet mixture was re-extruded into a sheet (referred to below as a "blank") approximately 75 microns (3 mils) thick with two smooth sides. The second extruder was a small Haake single-screw extruder coupled to a 5-inch (12.7 cm) flat film die. The die temperature was 260° C. (500° F.) operated at a film take-off speed of about 80 to about 125 feet/minute (24 to 38 meters/minute). The melt temperature was about 184° C. (364° F.). Because of difficulties in controlling the sheet thickness, some variation in thickness occurred. The average thickness was about 3.75 mils.

This blank was then embossed using a platen press to form cube-corner retroreflective elements in one side. An additional sheet of clear PMMA with two smooth sides (referred to herein as the body), about 75 microns (3 miles) in thickness, was simultaneously inserted with the colored sheet into the embossing press against the smooth platen and laminated to the smooth side of the embossed sheet to improve the structural integrity of the resultant cube-cornered sheeting. The operation involved about 10 seconds of preheating to a temperature approaching 188° C. (370° F.) followed by about 20 seconds of embossing, followed by about 8 minutes of cooling time. The embossing platen had a pattern which produced slightly canted, three sided cube corner elements about 175 microns (7 mils) in height, with multi-non-orthogonal modifications in accordance with the aforementioned U.S. Pat. Nos. 4,588,258 and 4,775,219.

Examples 2–5

IR-selective retroreflectors were prepared as in Example 1, except that the proportions of the various colored pellets were altered as indicated in Table I. Because of variations in smooth sheet extrusions, average thickness of each blank is shown in Table II.

Comparative Example A

Two smooth-sided 75 micron (3 mil) sheets of clear PMMA were processed in the platen press as in Example 1 to form a visible light or non-IR-selective retroreflector.

Visible light and infrared retroreflective results of the samples from each Example are presented in Table III.

TABLE I

| Example | Red | Yellow | Green | Violet | Clear |
| --- | --- | --- | --- | --- | --- |
| 1 | 100.0 | 16.60 | 33.40 | 50.00 | 0.00 |
| 2 | 50.00 | 8.30 | 16.70 | 25.00 | 100.00 |
| 3 | 25.00 | 4.15 | 8.35 | 12.50 | 150.00 |
| 4 | 120.00 | 13.40 | 66.60 | 0.0 | 0.0 |
| 5 | 146.60 | 0.0 | 53.40 | 0.0 | 0.0 |
| A | 0.0 | 0.0 | 0.0 | 0.0 | 200.0 |

TABLE II

| Example | Blank[1] | Body[2] | Pathlength[3] |
| --- | --- | --- | --- |
| 1 | 3.7 | 2.9 | 16.84 |
| 2 | 3.1 | 3.3 | 15.54 |
| 3 | 3.0 | 3.3 | 15.34 |
| 4 | 3.8 | 3.3 | 17.04 |
| 5 | 3.3 | 3.1 | 15.94 |
| A | 2.7 | 2.7 | 0.00 |

[1]Average thickness in mils of blank.
[2]Average thickness in mils of body.
[3]Pathlength in mils through IR-selective portion of article.

TABLE III

| Example | Visible[1] | Infrared[2] |
| --- | --- | --- |
| 1 | 0.02 | 47 |
| 2 | 0.04 | 103 |
| 3 | 9.67 | 209 |
| 4 | 0.09 | 155 |
| 5 | 0.03 | 190 |
| A | 2128. | 230 |

[1]Retroreflective brightness of visible light in candela/lux/meter$^2$.
[2]Retroreflective brightness of infrared light as measured by modified RI-1000 (non-linear gray scale).

Various modifications and alterations of this invention will become apparent to those skilled in the art without departing from the scope and spirit of this invention.

What is claimed is:

1. A retroreflective article having first and second major sides, said first side being substantially flat and said second side having an array of cube-corner retroreflective elements thereon, wherein said elements comprise a polymeric matrix which is transmissive to infrared light but which is substantially opaque to visible light.

2. The article of claim 1 wherein said matrix absorbs at least about 90 percent of all wavelengths of light from about 400 millimicrons to about 700 millimicrons.

3. The article of claim 1 wherein said matrix absorbs at least about 99 percent of all wavelengths of light from about 400 millimicrons to about 700 millimicrons.

4. The article of claim 1 wherein said matrix absorbs at least about 99.5 percent of all wavelengths of light from about 400 millimicrons to about 700 millimicrons.

5. The article of claim 1 wherein said matrix transmits at least about 25 percent of all wavelengths of light from about 750 millimicrons to about 1100 millimicrons.

6. The article of claim 1 wherein said matrix transmits at least about 50 percent of all wavelengths of light from about 750 millimicrons to about 1100 millimicrons.

7. The article of claim 1 wherein said matrix transmits at least about 90 percent of all wavelengths of light from about 750 millimicrons to about 1100 millimicrons.

8. The article of claim 1 wherein said matrix transmits at least about 95 percent of all wavelengths of light from about 750 millimicrons to about 1100 millimicrons.

9. The article of claim i wherein said matrix absorbs at least about 90 percent of all wavelengths of light from about 400 millimicrons to about 700 millimicrons and transmits at least about 25 percent of all wavelengths of light from about 750 millimicrons and about 1150 microns.

10. The article of claim 1 wherein said matrix absorbs at least about 99.5 percent of all wavelengths of light between about 380 millimicrons and about 750 millimicrons.

11. The article of claim 1 wherein said matrix comprises a polymer which is substantially transmissive of both infrared light and visible light and a colorant which is transmissive to infrared light but which is substantially opaque to visible light.

12. The article of claim 1 wherein the absorbance of visible light by said matrix is such that substantially all visible light is absorbed within said article's minimum pathlength.

13. The article of claim 1 wherein said polymer is selected from the group consisting of: polycarbonate, polyalkylacrylates, polyalkylmethacrylates, polyesters, vinyl polymers, polyurethanes, cellulose esters, fluoropolymers, polyolefins, ionomeric copolymers, and copolymers of ethylene or propylene with acrylic acid, methacrylic acid, and vinyl acetate.

14. The article of claim 1 wherein said colorant is a dye selected from the group consisting of: C.I. Solvent Violet 13, C.I. Solvent Violet 31, C.I. Solvent Violet 32, C.I. Solvent Violet 33, C.I. Solvent Violet 36; C.I. Solvent Blue 94, C.I. Solvent Blue 97, C.I. Solvent Blue 101, C.I. Solvent Blue 121, C.I. Disperse Blue 60, C.I. Disperse Blue 198; C.I. Solvent Green 3, C.I. Solvent Green 26, C.I. Solvent Green 28; C.I. Solvent Yellow 93, C.I. Solvent Yellow 112, C.I. Solvent 113, C.I. Solvent 128, C.I. Solvent 129, C.I. Solvent 130, C.I. Solvent 163, C.I. Disperse Yellow 54, C.I. Disperse Yellow 64, C.I. Disperse Yellow 160; C.I. Solvent Orange 60, C.I. Solvent Orange 68; C.I. Solvent Orange 72; C.I. Solvent Orange 86, C.I. Disperse Orange 47; C.I. Solvent Red 52, C.I. Solvent Red 111, C.I. Solvent Red 117, C.I. Solvent Red 135, C.I. Solvent Red 138, C.I. Solvent Red 139, C.I. Solvent Red 169, C.I. Solvent Red 195, C.I. Solvent Red 207, and C.I. Disperse Red 5, Amaplast Violet PK, and mixtures thereof.

15. The article of claim 1 wherein said colorant comprises one or more pigments selected from the group consisting of: LITHOSOL TM Fost Scarlet, Benzedine Yellow, HELIOGEN TM Blue, C.I. Pigment Green 7, C.I. Pigment Blue 15, C.I. Pigment Red 167, and C.I. Pigment Yellow 89.

* * * * *

UNITED STATES PATENT AND TRADEMARK OFFICE
CERTIFICATE OF CORRECTION

PATENT NO. :   5,200,851

DATED      :   April 6, 1993

INVENTOR(S) :   James C. Coderre et al.

It is certified that error appears in the above-identified patent and that said Letters Patent is hereby corrected as shown below:

In Column 5, line 25, the number "297" should read --207--.

Column 5, line 38, the word "red)" should read --(red)--

In Column 7, line 64, the word "miles" should read --mils--.

Signed and Sealed this

Twelfth Day of April, 1994

Attest:

BRUCE LEHMAN

*Commissioner of Patents and Trademarks*

*Attesting Officer*